US011082599B2

(12) United States Patent
Qian (10) Patent No.: US 11,082,599 B2
(45) Date of Patent: Aug. 3, 2021

(54) CONTROLLING CAMERA FIELD-OF-VIEW BASED ON REMOTE VIEWER VOTING (71) Applicant: HANGZHOU TARUO INFORMATION TECHNOLOGY CO., LTD., Hangzhou (CN)

(72) Inventor: Hao Qian, Hangzhou (CN)

(73) Assignee: HANGZHOU TARUO INFORMATION TECHNOLOGY LLC, Hangzhou (CN)

(*) Notice: Subject to any disclaimer, the term of this patent is extended or adjusted under 35 U.S.C. 154(b) by 608 days.

(21) Appl. No.: 16/067,807

(22) PCT Filed: Jul. 18, 2017

(86) PCT No.: PCT/CN2017/093436
§ 371 (c)(1),
(2) Date: Jul. 2, 2018

(87) PCT Pub. No.: WO2019/014860
PCT Pub. Date: Jan. 24, 2019

(65) Prior Publication Data
US 2021/0168277 A1 Jun. 3, 2021

(51) Int. Cl.
H04N 5/232 (2006.01)
H04L 29/06 (2006.01)
G06F 3/0482 (2013.01)

(52) U.S. Cl.
CPC ......... H04N 5/23206 (2013.01); H04L 65/60 (2013.01); H04N 5/23216 (2013.01); H04N 5/23296 (2013.01); G06F 3/0482 (2013.01)

(58) Field of Classification Search
CPC ................................. H04N 5/23206
See application file for complete search history.

(56) References Cited

U.S. PATENT DOCUMENTS 6,947,966 B1* 9/2005 Oko, Jr. ............. G06Q 20/3678
235/382
2009/0021583 A1* 1/2009 Salgar .................... H04N 7/181
348/159

FOREIGN PATENT DOCUMENTS

CN 1476725 A 2/2004
CN 102460487 A 5/2012
CN 105814500 A 7/2016

OTHER PUBLICATIONS

International Search Report issued in PCT/CN/2017/093436 dated Oct. 12, 2017 (6 pages).

(Continued)

Primary Examiner — Roland J Casillas
(74) Attorney, Agent, or Firm — Osha Bergman Watanabe & Burton LLP (57) ABSTRACT A method for controlling a field-of-view (FOV) of a camera device. The method includes receiving, in response to the camera device capturing and broadcasting an image, a plurality of FOV selections from a plurality of viewer devices, where each of the plurality of FOV selections comprises a request to adjust the FOV of the camera device, selecting, based on a pre-determined criterion, an aggregate FOV selection from the plurality of FOV selections, and generating, in response to selecting the aggregate FOV selection, a control signal for adjusting the FOV of the camera device based on the aggregate FOV selection, where the camera device broadcasts, to the plurality of viewer devices, an adjusted image captured in response to adjusting the FOV of the camera device.

20 Claims, 9 Drawing Sheets (56) References Cited

OTHER PUBLICATIONS

Written Opinion issued in PCT/CN/2017/093436 dated Oct. 12, 2017 (4 pages).

\* cited by examiner

CONTROLLING CAMERA FIELD-OF-VIEW BASED ON REMOTE VIEWER VOTING

BACKGROUND

Web conferencing is an online collaborative service, such as web seminars ("webinars"), webcasts, and peer-level web meetings. Services may allow real-time point-to-point communications and multicast communications from a sender to multiple receivers. For example, webcast is a media presentation distributed over the Internet using streaming media technology to distribute simultaneously a single content source to multiple listeners/viewers. A webcast may either be distributed live or on demand. Webcasting may be considered as "broadcasting" over the Internet.

SUMMARY

In general, in one aspect, the invention relates to a method for controlling a field-of-view (FOV) of a camera device. The method includes receiving, in response to the camera device capturing and broadcasting an image, a plurality of FOV selections from a plurality of viewer devices, where each of the plurality of FOV selections comprises a request to adjust the FOV of the camera device, selecting, based on a pre-determined criterion, an aggregate FOV selection from the plurality of FOV selections, and generating, in response to selecting the aggregate FOV selection, a control signal for adjusting the FOV of the camera device based on the aggregate FOV selection, where the camera device broadcasts, to the plurality of viewer devices, an adjusted image captured in response to adjusting the FOV of the camera device.

In general, in one aspect, the invention relates to a field-of-view (FOV) controller for a camera device. The FOV controller includes a computer processor and memory storing instructions. The instructions, when executed, cause the computer processor to receive, in response to the camera device capturing and broadcasting an image, a plurality of FOV selections from a plurality of viewer devices, where each of the plurality of FOV selections comprises a request to adjust the FOV of the camera device, select, based on a pre-determined criterion, an aggregate FOV selection from the plurality of FOV selections, and generate, in response to selecting the aggregate FOV selection, a control signal for adjusting the FOV of the camera device based on the aggregate FOV selection, where the camera device broadcasts, to the plurality of viewer devices, an adjusted image captured from the camera device in response to adjusting the FOV of the camera device.

In general, in one aspect, the invention relates to a non-transitory computer readable medium storing instructions for controlling a field-of-view (FOV) of a camera device. The instructions, when executed by a computer processor, include functionality for receiving, in response to the camera device capturing and broadcasting an image, a plurality of FOV selections from a plurality of viewer devices, where each of the plurality of FOV selections comprises a request to adjust the FOV of the camera device, selecting, based on a pre-determined criterion, an aggregate FOV selection from the plurality of FOV selections, and generating, in response to selecting the aggregate FOV selection, a control signal for adjusting the FOV of the camera device based on the aggregate FOV selection, where the camera device broadcasts, to the plurality of viewer devices, an adjusted image captured in response to adjusting the FOV of the camera device.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

DETAILED DESCRIPTION

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components.

Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for controlling a field-of-view (FOV) of a camera device. In one or more embodiments of the invention, a FOV selection message or menu is presented on each of a number of viewer devices. In particular, the FOV selection message or menu is associated with an image that is captured and broadcasted by the camera device. In response to presenting the FOV selection message or menu, multiple FOV selections are received from multiple viewer devices. Accordingly, an aggregate FOV selection is selected from the multiple FOV selections. In response to selecting the aggregate FOV selection, a control signal is generated for adjusting the FOV of the camera device based on the aggregate FOV selection. Using the control signal, the FOV of the camera device is adjusted according to the aggregate FOV selection such that the camera device broadcasts an adjusted image to the multiple viewer devices. In one or more embodiments of the invention, the image and adjusted image broadcasted by the camera device are part of live streaming content of a webcast. In particular, the user of the camera device appears as an anchor of the webcast and the FOV selections request to change the FOV with respect to where the anchor appears in the image.

Figure 11:
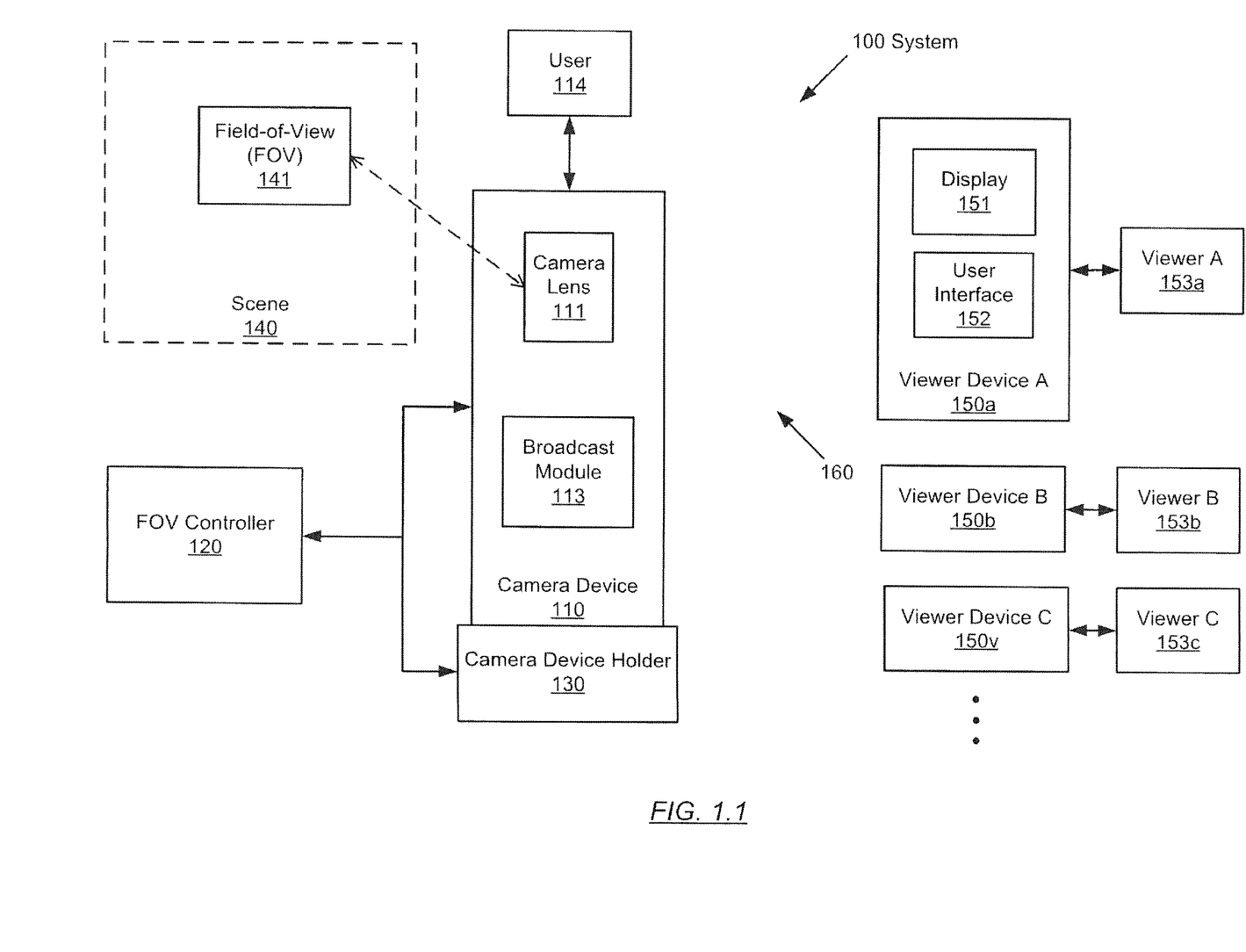

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) used by a user (114), a camera field-of-view (FOV) controller (120), a camera device holder (130), a scene (140), and multiple viewer devices (e.g., viewer device A (150a), viewer device B (150b), viewer device C (150c), etc.) used by corresponding viewers (e.g., viewer A (153a), viewer B (153b), viewer C (153c), etc.). Further, the camera device (110), camera field-of-view (FOV) controller (120), and camera device holder (130) are communicatively coupled to each other. In addition, the camera device (110) and the viewer devices (e.g., viewer device A (150a), viewer device B (150b), viewer device C (150c), etc.) are coupled via a wireless/wired communication network (160), such as the Internet. In one or more embodiments of the invention, two or more of the camera device (110), FOV controller (120), and camera device holder (130) are integrated into a single device.

In one or more embodiments of the invention, the camera device (110) is a device with a camera lens (e.g., camera lens (111)) and associated components for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface of the smart phone.

In one or more embodiments, the scene (140) is a place where an action or event, imaged by the camera device (110), occurs. The field-of-view (FOV) (141) is an extent of the scene (140) that is imaged by the camera device (110) using the camera lens (111). In other words, an object inside the FOV (141) will appear in an image captured and/or outputted by the camera device (110). For example, the FOV (141) may correspond to a solid angle within which the camera lens (111) projects light input to an associated optical sensor (not shown) of the camera device (110). In one or more embodiments, the FOV (141) corresponds to different portions of the scene (140) according to how the camera lens (111) is oriented toward, zoomed with respect to, or otherwise positioned relative to, the scene (140).

Further as shown in FIG. 1.1, the camera device (111) includes a broadcast module (113) that is configured to broadcast, via the wireless/wired communication network (160), images (e.g., photographs and/or video recordings) captured using the camera lens (111). In one or more embodiments, the broadcast module (113) includes a hardware component, a software component, or a combination thereof. In one or more embodiments, the broadcast module (113) and wireless/wired communication network (160) may include, or otherwise be implemented using, at least a portion of the computing system (700) and network (720) described in reference to FIGS. 7A and 7B below.

In one or more embodiments, the broadcast module (113) broadcasts the images (e.g., photographs and/or video recordings) during web conferencing to the viewer devices (e.g., viewer device A (150a), viewer device B (150b), viewer device C (150c), etc.). For example, the web conferencing may be a live webcast where the user (114) acts as an anchor featured in the streaming content of the live webcast. In other words, the user (114) appears in the scene (140) as the anchor of the webcast that is viewed by the viewers (e.g., viewer A (153a), viewer B (153b), viewer C (153c), etc.) using the viewer devices (e.g., viewer device A (150a), viewer device B (150b), viewer device C (150c), etc.). As used herein, an anchor is a person who is the main broadcaster on a webcast program, such as news, talk show, sports, live video game streaming, etc. In one or ore embodiments, the broadcast module (113) broadcasts the images (e.g., photographs and/or video recordings) via a webcast server operated by an Internet webcast service provider.

In another example, the web conferencing may be a web meeting where the user (114) is one of multiple meeting attendees at a meeting location serviced by the camera device (110). In other words, the user (114) appears in the scene (140) among other local meeting attendees of the web meeting while the viewers (e.g., viewer A (153a), viewer B (153b), viewer C (153c), etc.) correspond to remote meeting attendees of the web meeting. In one or ore embodiments, the broadcast module (113) broadcasts the images (e.g., photographs and/or video recordings) via a web meeting server operated by an Internet web meeting service provider.

In either of the two examples above, the user (114) may partially or completely appear within the FOV (141) depending on where the FOV (141) is disposed within the scene (140). As noted above, the FOV (141) may correspond to different portions of the scene (140) according to how the camera lens (111) is oriented toward, zoomed with respect to, or otherwise positioned relative to, the scene (140).

In one or more embodiments, the images (e.g., photographs and/or video recordings) in the webcast or web meeting may include (e.g., be superimposed by) a message (not shown) prompting the viewers (e.g., viewer A (153a), viewer B (153b), viewer C (153c), etc.) to submit a request to change the FOV (141) of the camera lens (111). In such embodiments, the request to change the FOV (141) of the camera lens (111) is a FOV selection.

In one or more embodiments, the images (e.g., photographs and/or video recordings) in the webcast or web meeting may include (e.g., be superimposed by) a graphical user interface menu (referred to as the FOV selection menu)

(not shown) prompting the viewers (e.g., viewer A (153a), viewer B (153b), viewer C (153c), etc.) to submit FOV selections. Each entry of the FOV selection menu is a request to change the FOV (141) of the camera lens (111). Accordingly, a FOV selection is a selected entry of the FOV selection menu (not shown). The FOV selection menu and FOV selections are described in further details in reference to FIG. 1.2 below. An example of the FOV selection menu and FOV selections contained therein is described in reference to FIGS. 4, 5, and 6 below.

In one or more embodiments of the invention, the camera device holder (130) is configured to mechanically hold the camera device (110) and to adjust, in response to a control signal from the FOV controller (120), the FOV (141) of the camera lens (111). For example, the camera device holder (130) may include a motorized tilt and swivel device for adjusting a camera angle of the camera lens (111). In another example, the camera device holder (130) may include a motorized horizontal and vertical sliding device for adjusting a position of the camera lens (111) relative to the scene (140). The sliding device may include a mechanical stage for holding and moving the camera device (110). Examples of the camera device holder (130) are described in reference to FIGS. 3A and 3B below.

Figure 12:
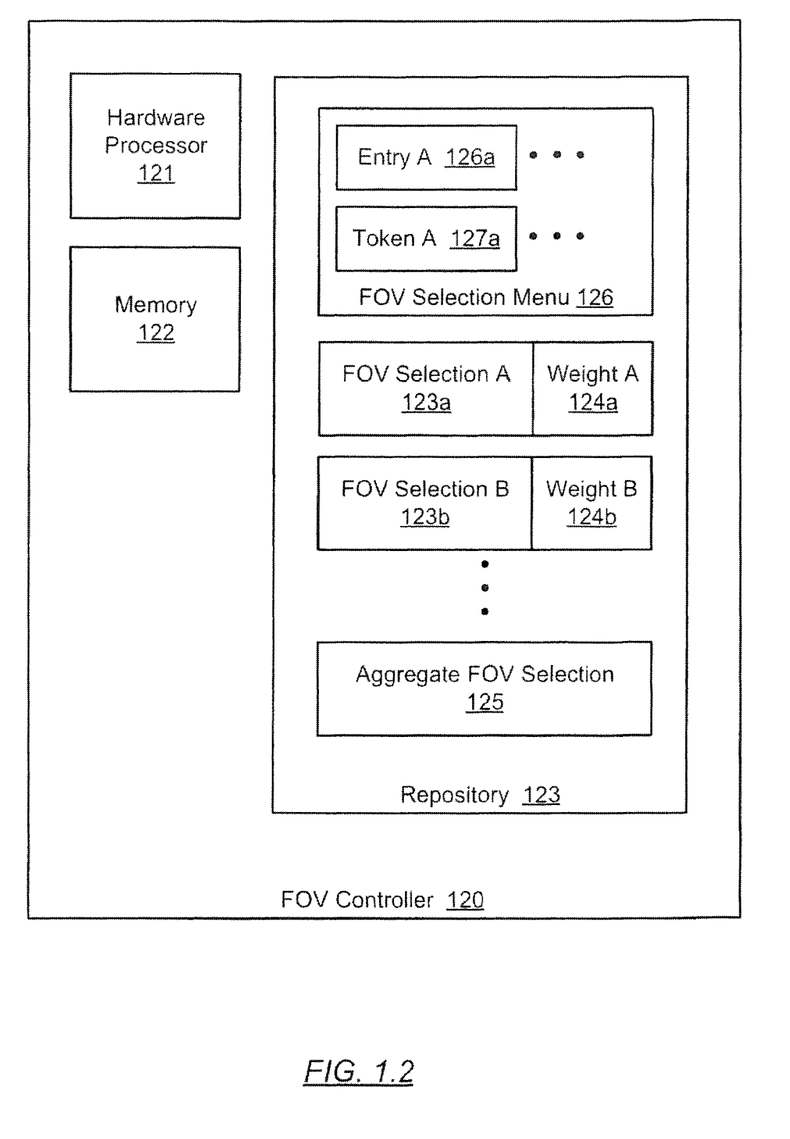

In one or more embodiments, the FOV controller (120) includes a hardware component, a software component, or a combination thereof that is configured to adjust the FOV (141) of the camera lens (111). For example, the FOV controller (120) may control the FOV (141) by way of controlling the camera device holder (130). In another example, the FOV controller (120) may further control the FOV (141) by way of controlling a zoom level of the camera lens (111). In one or more embodiments, the FOV controller (120) controls the FOV (141) in response to FOV selections received from the viewer devices (e.g., viewer device A (150a), viewer device B (150b), viewer device C (150c), etc.). In one or more embodiments, the FOV controller (120) controls the FOV (141) using the method described in reference to FIG. 2 below. In one or more embodiments, the FOV controller (120) include the components described in reference to FIG. 1.2 below.

In one or more embodiments, a viewer device (e.g., viewer device A (150a), viewer device B (150b), viewer device C (150c), etc.) is a computing device with communication capability, such as a smart phone, a gaming console, a smart TV, a tablet computer, a laptop computer, a desktop computer, etc. In particular, each viewer device includes a display and a user interface, such as the display (151) and user interface (152) of the viewer device A (150a). In one or more embodiments, the display (151) is configured to display the images (e.g., photographs and/or video recordings) of a webcast or a web meeting that is received by the viewer device A (150a) via the wireless/wired communication network (160), such as the Internet. In particular, the display (151) is configured to display the FOV selection menu included in the images (e.g., photographs and/or video recordings). In one or more embodiments, the user interface (152) is configured to receive one or more FOV selections from the viewer A (153a) for sending to the camera device (110) and/or FOV controller (120). For example, the user interface (152) may be based on a touch-sensitive portion of the display (151), a keyboard, mouse, or other pointing device of the viewer device A (150a), etc. An example of the user interface (152) is described in reference to FIGS. 4, 5, and 6 below.

FIG. 1.2 shows details of the FOV controller (120) in accordance with one or more embodiments. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

Figure 2:
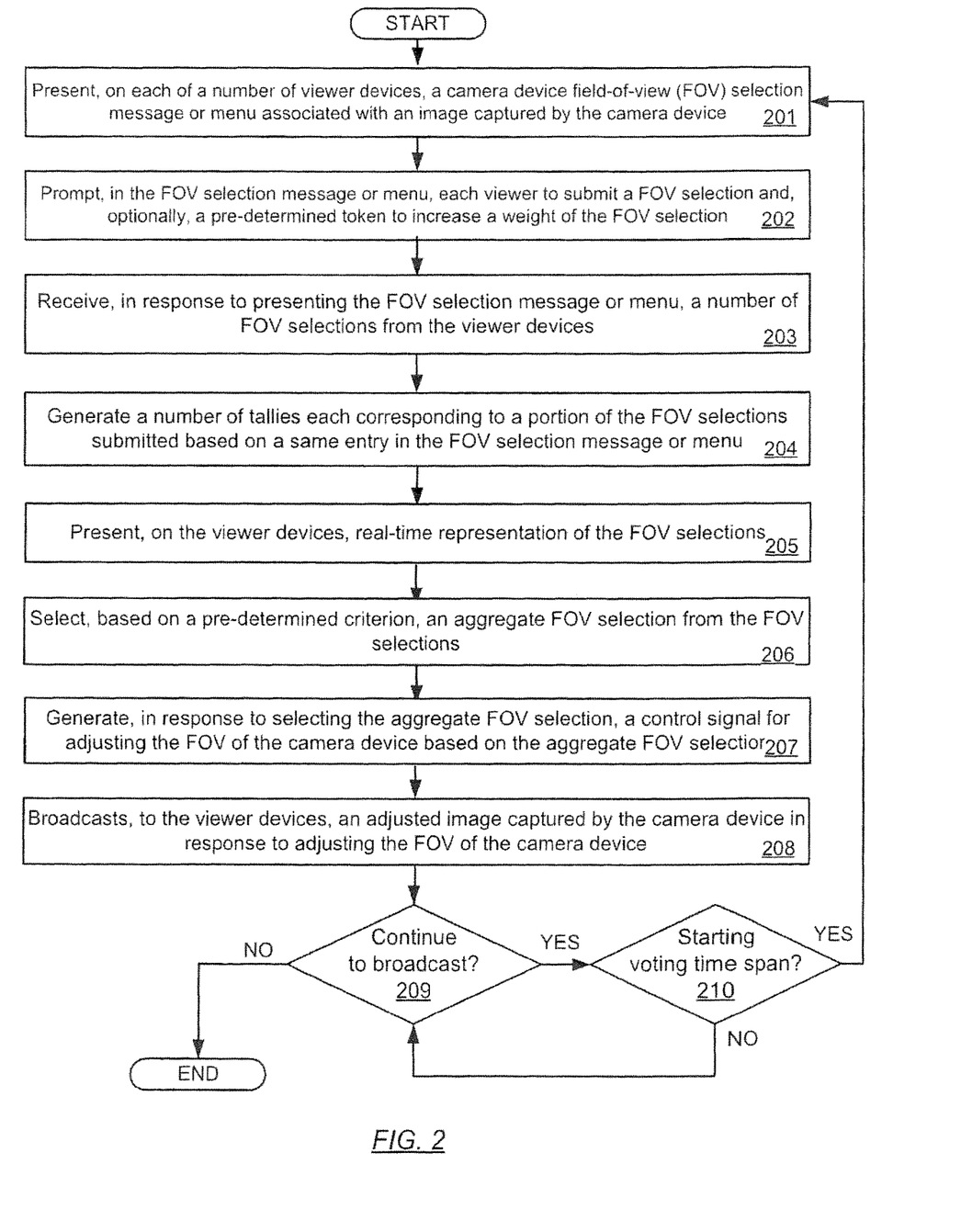
FIG. 2 shows a method flowchart in accordance with one or more embodiments of the invention.

As shown in FIG. 1.2, the FOV controller (120) includes a hardware processor (121), memory (122), and repository (123). In one or more embodiments of the invention, the hardware processor (121) corresponds to the computer processors (702) depicted in FIG. 7A below. Similarly, the memory (122) and repository (123) correspond to the non-persistent storage (704) and/or persistent storage (706) depicted in FIG. 7A below. For example, the memory (122) may store software instructions that, when executed, cause the hardware processor (121) to perform FOV adjustment functionalities of the camera device (110) depicted in FIG. 1.1 above. In one or more embodiments, the FOV controller (120) performs the FOV adjustment functionalities according to the method flowchart described in reference to FIG. 2 below. In one or more embodiments, the memory (122) stores instructions to perform one or more portions of the method flowchart described in reference to FIG. 2 below. In one or more embodiments, the FOV controller (120) and the camera device (110) are integrated into a single device. In such embodiments, the instructions to perform one or more portions of the method flowchart described in reference to FIG. 2 are part of a mobile application, or mobile app, which is a user-installable software application designed to run on a smart phone or other mobile devices.

Further as shown in FIG. 1.2, the repository (123) includes a FOV selection menu (126) that defines available selections for adjusting the FOV (141) depicted in FIG. 1.1. above. Each available selection is defined by one of multiple entries of the FOV selection menu (126). For example, the entry A (126a) may define the FOV selection to move the FOV (141) along a pre-determined direction (e.g, up, down, left, right) and by a pre-determined amount (e.g., distance, angle) in the scene (140). In another example, the other entry in the FOV selection menu (126) may define the FOV selection to move the FOV (141) to a pre-determined location in the scene (140). In yet another example, another entry in the FOV selection menu (126) may define the FOV selection to change the zoom level (e.g, zoom-in, zoom-out) of the FOV (141). In one or more embodiments, the FOV controller (120) is configured to provide the a FOV selection menu (126) to the camera device (110) for including in the broadcasted images (e.g., webcast, web meeting). Accordingly, the viewers (e.g., viewer A (153a), viewer B (153b), viewer C (153c), etc.) may submit individual FOV selections in response to viewing the FOV selection menu (126) on corresponding viewer devices (e.g., viewer device A (150a), viewer device B (150b), viewer device C (150c), etc.).

In one or more embodiments, the FOV selection menu (126) further includes tokens (e.g., token A (127a)). In particular, a token is a weight available for a viewer to optionally assign to any entry selected by the viewer. For example, the weight may correspond to a numerical value, a text code, or other representation of a level of influence. In one or more embodiments, upon viewing the FOV selection menu (126) on the display (151), the viewer A (153a) may acquire the token (e.g., token A (127a)) using the user interface (152). For example, the viewer A (153a) may acquire the token (e.g., token A (127a)) by submitting a payment or other type of credit, accepted by the webcast or web meeting service provider, using the user interface (152). Subsequent to acquiring the token (e.g., token A (127a)), the viewer A (153a) may assign the token (e.g., token A (127a)) to any selected entry (e.g., entry A (126a)) using the user interface (152). Subsequent to selecting the entry (e.g., entry A (126a)) and assigning the token (e.g, token A (127a)), the selected entry (e.g., entry A (126a)) and assigned token (e.g., token A (127a)) may be sent to the FOV controller (120) as a FOV selection. The FOV selection may also be sent without any assigned token, in which case, the FOV selection may be associated with a default weight (e.g., a weight of 1). An example of the FOV selection menu (126) and entries/tokens contained therein is described in reference to FIG. 4 below.

Returning to the discussion of FIG. 1.2, the repository (123) further includes FOV selections received from viewer devices (e.g., viewer device A (150a), viewer device B (150b), viewer device C (150c), etc.). For example, the FOV selection A (123a) associated with the weight A (124a) may be received from the viewer device A (150a) and correspond to an entry (e.g., entry A (126a) or any other entry) and token (e.g., token A (127a) or any other token) that are selected by the viewer A (153a). Similarly, the FOV selection B (123b) associated with the weight B (124b) may be received from the viewer device B (150b) and correspond to an entry (e.g., entry A (126a) or any other entry) and token (e.g., token A (127a) or any other token) that are selected by the viewer B (153b).

In one or more embodiments, the FOV controller (120) is configured to select an aggregate FOV selection (125) from the FOV selections (e.g., FOV selection A (123a), FOV selection B (123b)) received from viewer devices (e.g., viewer device A (150a), viewer device B (150b), viewer device C (150c), etc.). In one or more embodiments, each FOV selection (e.g., FOV selection A (123a), FOV selection B (123b)) contributes one or more votes, based on the associated weight (e.g., weight A (124a), weight B (124b)), in selecting the aggregate FOV selection (125). In one or more embodiments, the FOV controller (120) selects the aggregate FOV selection (125) from the FOV selections (e.g., FOV selection A (123a), FOV selection B (123b)) using the method described in reference to FIG. 2 below. An example of the FOV selections, and associated weights, received by the FOV controller (120) is described in reference to FIG. 5 below.

Although FIG. 1.2 is described above based on the FOV selection menu (126), in one or more embodiments, the FOV selection menu (126) may be substituted by a message sent from the FOV controller (120). For example, the message may have a more flexible format than the FOV selection menu (126) but include similar information to prompt viewers to submit FOV selections. In another example, the message may include the FOV selection menu (126).

FIG. 2 shows a flowchart in accordance with one or more embodiments. The process shown in FIG. 2 may be executed, for example, by one or more components discussed above in reference to FIGS. 1.1 and 1.2. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, in Step 201, a camera device field-of-view (FOV) selection message or menu is presented on each of a number of viewer devices. In one or more embodiments of the invention, the FOV selection message or menu is associated with an image captured by a camera device as part of live streaming content of a webcast viewed by multiple viewers. In one or more embodiments, the FOV selection message or menu is presented during a voting time span, which is recurring according to a pre-determined schedule, initiated in response to an input from a user of the camera device, or initiated in response to other types of events. In other words, each of the pre-determined schedule, the input from the user of the camera device, or other types of events is a trigger condition to initiate the recurring voting time span. For example, the user of the camera device may be an anchor appearing in the live streaming content of the webcast.

In Step 202, each viewer is prompted, in the FOV selection message or menu, to submit a FOV selection to request a change in the FOV of the image. In one or more embodiments, the FOV selection message or menu further prompt each view to select a token to increase a weight of the FOV selection.

In Step 203, in response to presenting the FOV selection message or menu, multiple FOV selections are received from the viewer devices. In one or more embodiments, at least one of the FOV selections has an increased weight according to a token selected by a viewer.

In Step 204, tallies are generated where each tally corresponds to a portion of the FOV selections requesting the same or similar change in the FOV (e.g., submitted based on a same entry in the menu of FOV selections). In one or more embodiments, each tally corresponds to the number of the FOV selections from the same entry in the FOV selection menu. In one or more embodiments, the contribution to the tally from each FOV selection is weighted based on the optional token selected by the viewer.

In Step 205, a real-time representation of the FOV selections is presented on the viewer devices. In one or more embodiments, the representation of the FOV selections includes tallies of each entry selected by the viewers from the FOV selection menu. In one or more embodiments, the tallies of the FOV selections are represented graphically on the viewer devices.

In Step 206, an aggregate FOV selection is selected from the FOV selections based on a pre-determined criterion. In one or more embodiments, the aggregate FOV selection is selected from the FOV selections based on a statistical measure of the tallies, such as a maximum, a minimum, a median, a mean, etc. of the tallies. For example, the FOV selection corresponding to the FOV selection menu entry with highest tally may be selected as the aggregate FOV selection. In another example, the FOV selection corresponding to the FOV selection menu entry with lowest tally may be selected as the aggregate FOV selection. In one or more embodiments, the aggregate FOV selection is selected at the end of the aforementioned voting time span. For example, the voting time span may end according to a pre-determined schedule or in response to an input from the user of the camera device.

In Step 207, in response to selecting the aggregate FOV selection, a control signal is generated for adjusting the FOV of the camera device based on the aggregate FOV selection. In one or more embodiments, the control signal controls one or more of a rotating motor, a tilting motor, a horizontal mechanism of a mechanical stage, and a vertical mechanism of a mechanical stage of a camera device holder holding the camera device. Accordingly, the FOV is adjusted by adjusting a lens angle and/or a position of a lens in the camera device.

In Step 208, an adjusted image is captured by the camera device in response to adjusting the FOV of the camera device. In one or more embodiments, the adjusted image is broadcasted to the viewers in the live streaming content of the webcast.

In Step 209, a determination is made as to whether to continue broadcasting images to the viewers. If the determination is positive, i.e., the broadcast is to continue, the method returns to Step 210. If the is negative, i.e., the broadcast is not to continue, the method ends.

In Step 210, a determination is made as to whether a subsequent voting time span is to begin. If the determination is positive, i.e., another voting time span is to start, the method returns to Step 201. If the is negative, i.e., another voting time span is not yet to start, the method returns to Step 209.

Although FIG. 2 is described above based on the FOV selection menu, in one or more embodiments, the FOV selection menu may be substituted or omitted. For example, the FOV selection menu may be substituted by a message sent from the FOV controller that may have a more flexible format than the FOV selection menu but include similar information to prompt viewers to submit FOV selections. In another example, the FOV selections may be submitted by viewers without being prompted by the FOV selection menu.

FIGS. 3A, 3B, 4, 5, and 6 show various examples in accordance with one or more embodiments of the invention. The examples shown in FIGS. 3A, 3B, 4, 5, and 6 may be, for example, based on one or more components depicted in FIGS. 1.1 and 1.2 above and the method flowchart depicted in FIG. 2 above. In one or more embodiments, one or more of the modules and elements shown in FIGS. 3A, 3B, 4, 5, and 6 may be omitted, repeated, and/or substituted. Accordingly, embodiments of the invention should not be considered limited to the specific arrangements of modules shown in FIGS. 3A, 3B, 4, 5, and 6.

Figure 3A:
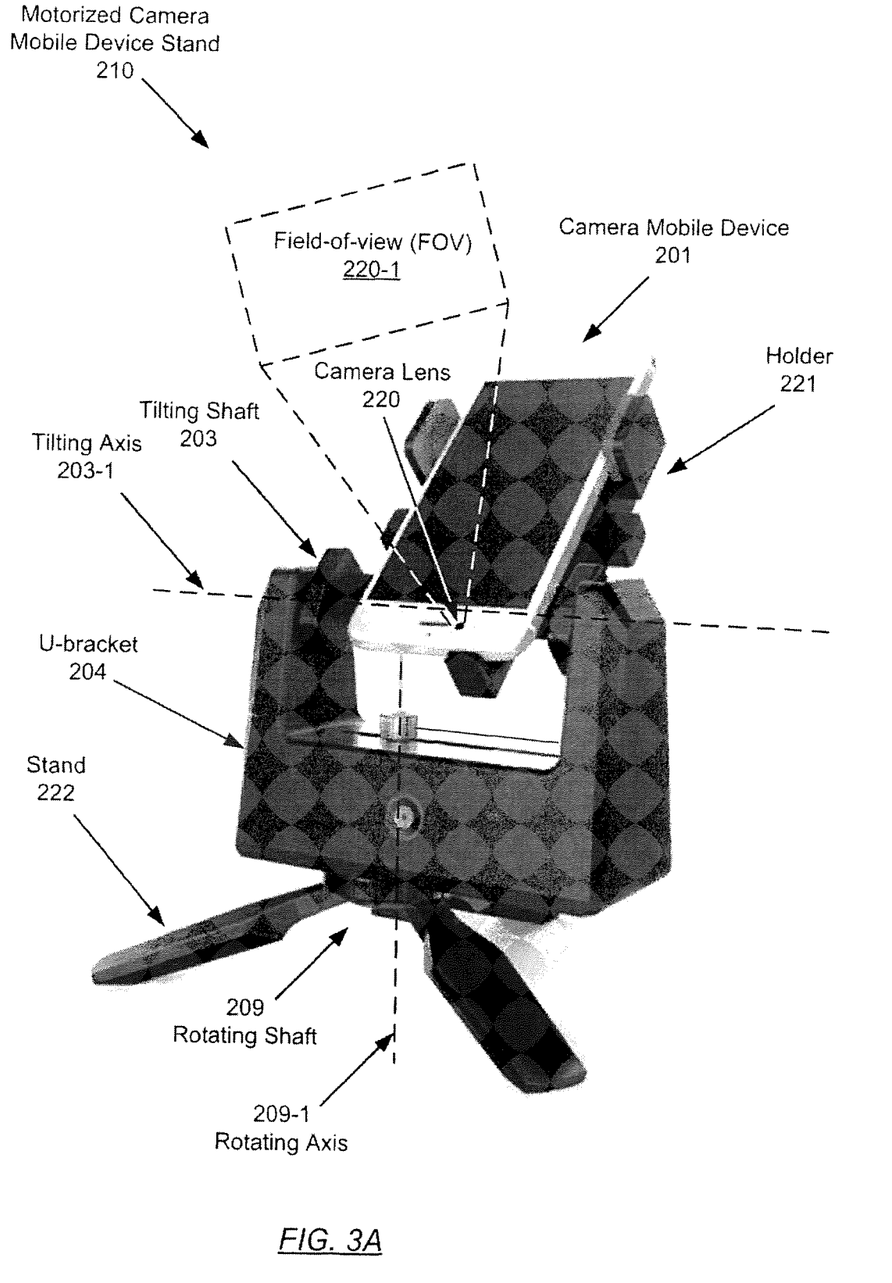
FIGS. 3A, 3B, 4, 5, and 6 show various examples in accordance with one or more embodiments of the invention.

FIG. 3A shows a motorized camera mobile device stand (210) as an example of the camera device holder (130) depicted in FIG. 1.1 above. In addition, a camera mobile device (201) (e.g., a smart phone having a camera lens (220)), mechanically held by the motorized camera mobile device stand (210), is an example of the camera device (110) depicted in FIG. 1.1 above. In one or more embodiments of the invention, the motorized camera mobile device stand (210) is an electro-mechanical assembly that includes a holder (221), a tilting shaft (203), an U-bracket (204), a rotating shaft (209), and a stand (222). The holder (221) is configured to mechanically hold the camera mobile device (201) and mechanically couple to the tilting shaft (203). The stand (222) is configured to maintain, while being placed on a solid surface, mechanical stability of the motorized camera mobile device stand (210). Although not explicitly shown, the U-bracket (204) houses a tilting motor coupled to the tilting shaft (203), a rotating motor coupled to the rotating shaft (209), and a communication interface configured to communicate with the camera device (110) and/or the FOV controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor in response to a control signal received from the FOV controller (120) via the communication interface. Similarly, the tilting shaft (203) is rotatable by the tilting motor around a tilting axis (203-1) in response to the control signal received from the FOV controller (120) via the communication interface. In response to tilting the holder (221) around the tilting axis (203-1) and/or rotating the holder (221), collectively with the tilting shaft (203) and the bracket (204), around the rotating axis (209-1), the orientation of the camera lens (220) may be adjusted. Accordingly, the FOV (220-1) of the camera lens (220) is adjusted according to the orientation of the camera lens (220).

Figure 3B:
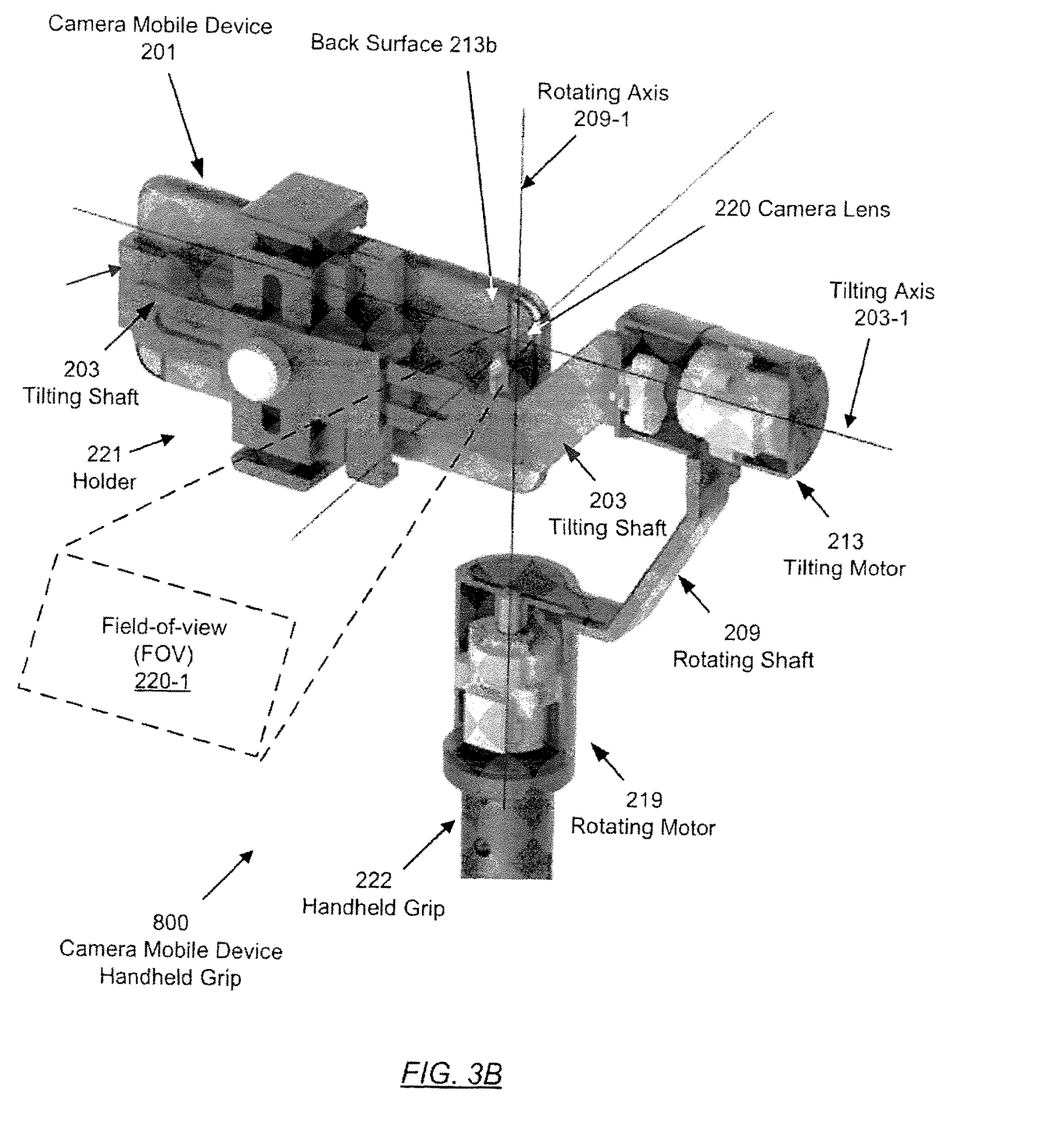

FIG. 3B shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a user, mechanical stability of the camera mobile device handheld grip (800). Although not explicitly shown, the handheld grip (222) includes a communication interface configured to communicate with the camera device (110) and/or the FOV controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the FOV controller (120) via the communication interface. Similarly, the tilting shaft (203) is rotatable by the tilting motor (213) around a tilting axis (203-1) in response to the control signal received from the FOV controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220).

Figure 4:
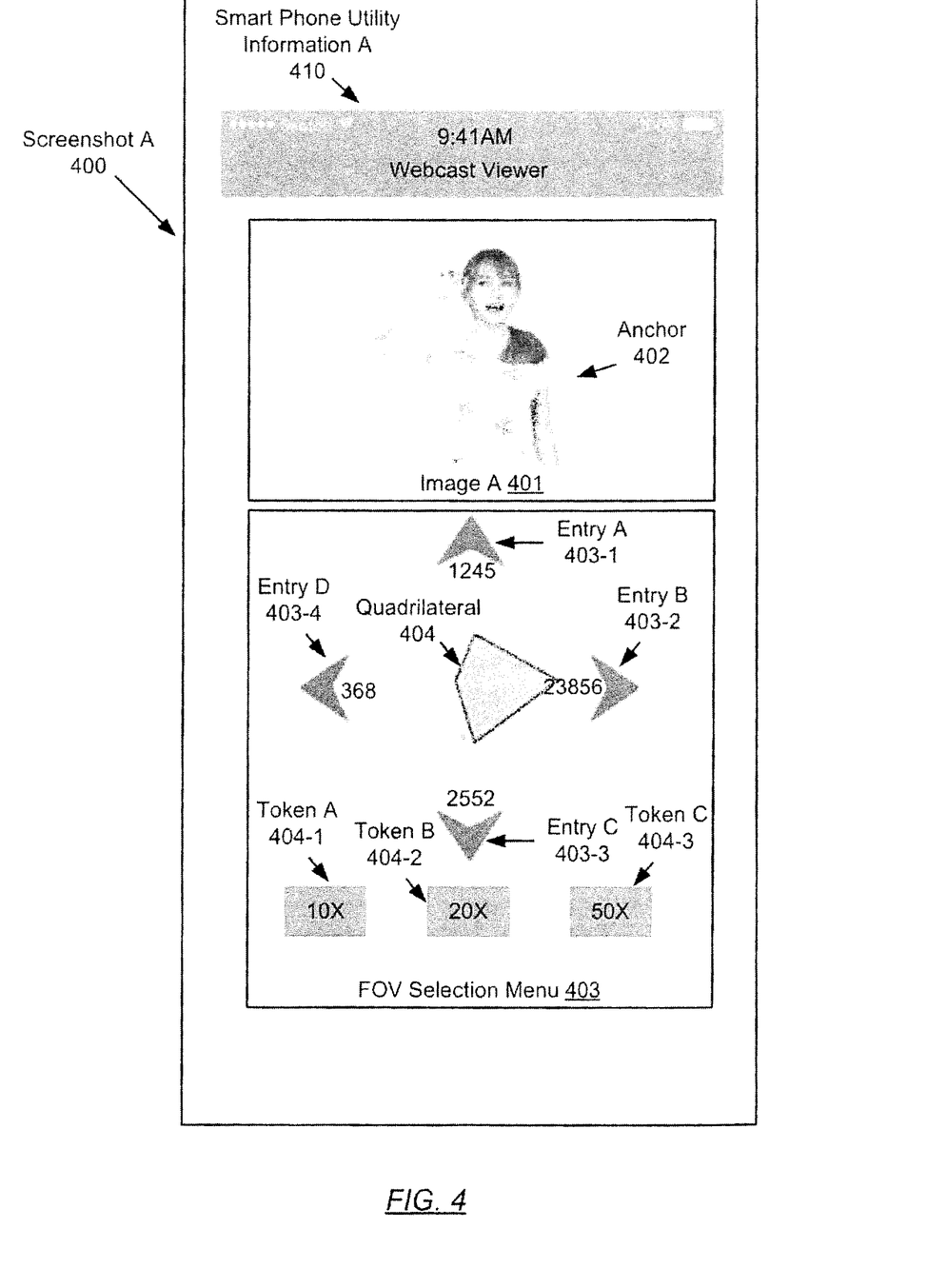

FIG. 4 shows an example screenshot A (400) of the display (151) depicted in FIG. 1.1 above. As shown in FIG. 4, the screenshot A (400) includes smart phone utility information A (410), an image A (401), and a FOV selection menu (403). In particular, the smart phone utility information A (410) indicates that the screenshot A (400) is captured at 9:41 AM on a webcast viewer's device, such as the viewer device A (150a) depicted in FIG. 1.1 above. The image A (401) shows an image of an anchor (402) of the webcast where the anchor (402) corresponds to the user (114) depicted in FIG. 1.1 above. In other words, the image A (401) is part of the live streaming content of the webcast. In particular, the anchor (402) appears in the center portion of the image A (401). In addition, the FOV selection menu (403) is an example of the FOV selection menu (126), depicted in FIG. 1.2 above, that is included in the live streaming content of the webcast. In the screenshot A (400), the FOV selection menu (403) is located at a touch-sensitive area, which is an example of the user interface (152) depicted in FIG. 1.1 above.

Within the example screenshot (400), the FOV selection menu (403) includes an entry A (403-1), entry B (403-2), entry C (403-3), and entry D (403-4), each of which is an example, as depicted in FIGS. 1.1 and 1.2 above, of the entry A (126a) that requests to move the FOV (141) in a pre-determined direction. Specifically, the entry A (403-1), entry B (403-2), entry C (403-3), and entry D (403-4) correspond to the up, right, down, and left directions, respectively. For example, as depicted in FIGS. 1.1 and 1.2 above, the entry A (403-1), entry B (403-2), entry C (403-3), or entry D (403-4) may be selected by the viewer A (153a) to move the FOV (141) to the up, right, down, or left direction, respectively. In addition, the FOV selection menu (403) includes a token A (404-1), a token B (404-2), and a token C (404-3) that may be acquired by the viewer A (153a) submitting a payment or other form of acceptable credit. Subsequent to acquiring the token A (404-1), token B (404-2), or token C (404-3), the viewer A (153a) may assign the acquired token to increase the weight of the selected entry. In particular, the token A (404-1), token B (404-2), or token C (404-3) increases the weight by 10 times, 20 time, or 50 times, respectively.

In an example scenario based on FIGS. 1.1, 1.2, and 4, the viewer A (153a) activates the touch-sensitive entry A (403-1) and touch-sensitive token B (404-2) on the viewer device A (150a) during a voting time span. In response, 20 votes (i.e., the weighted vote) is submitted from the viewer device A (150a) to the FOV controller (120) to be included in a tally A for the FOV selection to move the FOV (141) toward the up-direction. In a similar manner, during the same voting time span, the viewer B (153b) uses the viewer device B (150b) to submit 10 votes (i.e., the weighted vote) to the FOV controller (120) to be included in a tally B for the FOV selection to move the FOV (141) toward the right-direction. For example, the voting time span may be recurring periodically during the webcast and have a pre-determined length, such as 10 seconds, 1 minute, etc. In another example, the voting time span may be initiated/terminated in response to an input from the user (114). During the voting time span, the tallies (e.g., tally A, tally B) may be displayed in real time in the FOV selection menu (403). For example, each of the entry A (403-1), entry B (403-2), entry C (403-3), and entry D (403-4) is annotated with a corresponding tally showing 1245 weighted votes, 23856 weight votes, 2552 weighted votes, and 368 weighted votes, respectively, that have been received by the FOV controller (120) as of 9:41 AM. The tallies (e.g., tally A, tally B) may also be displayed in a graphical form, such as the quadrilateral (404) where the coordinate of each vertex corresponds to one of the four tallies. In one or more embodiments, the tallies are displayed in real time on multiple view devices (e.g., viewer device A (150a) to prompt the viewers (e.g., viewer A (153a) to timely submit FOV selections with the optional tokens. Further, during the voting time span, the user (114) may view the tallies (e.g., tally A, tally B) on a display (not shown) of the camera device (110) or FOV controller (120). In one or more embodiments, the tallies are displayed in real time as a reference for the user (114) in determining when to terminate the aforementioned voting time span. An example of the real-time tallies displayed for viewing by the user (114) is depicted as the tallies (520) in FIG. 5 below.

Figure 5:
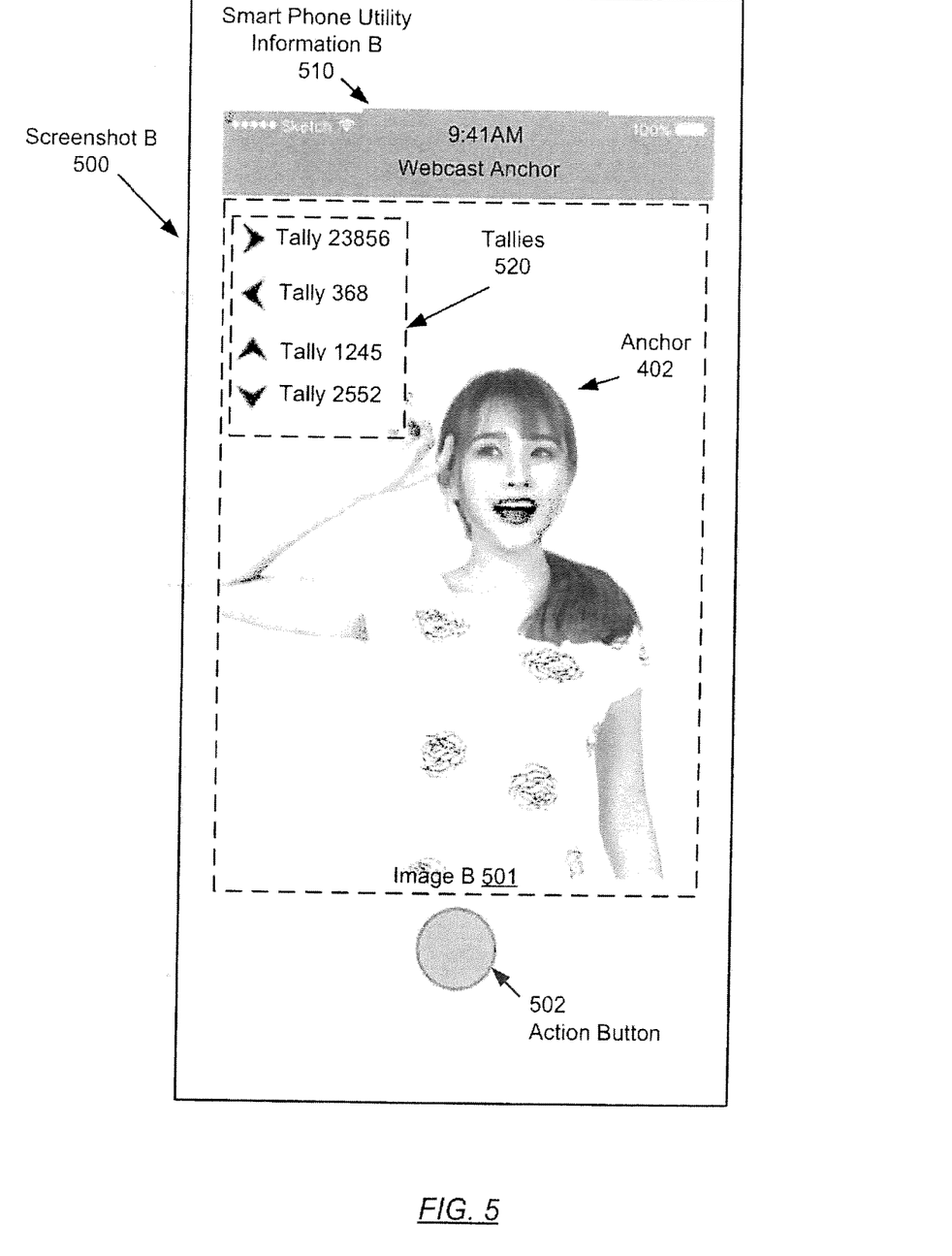

FIG. 5 shows an example screenshot B (500) of a display (not shown) of the camera device (110) or FOV controller (120) depicted in FIG. 1.1 above. As shown in FIG. 5, the screenshot B (500) includes smart phone utility information B (510), an image B (501), tallies (520), and an action button (502). In particular, the smart phone utility information B (510) indicates that the screenshot B (500) is captured at 9:41 AM on a webcast anchor's device, such as the camera device (110) or FOV controller (120) depicted in FIG. 1.1 above. The image B (501) shows the live streaming content of the webcast to the user (114), who acts as the anchor (402) of the webcast. In particular, the image B (501) may be a preview copy of the image A (401) depicted in FIG. 4 above. The tallies (520) shows, in real time, FOV selections (in terms of weighted votes) received from all viewers of the webcast.

Continuing with the aforementioned example scenario, at 9:41 AM, the user (114) (i.e., anchor (402)) activates the action button (502) to end the voting time span. The tally of 23856 turns out to be the highest weighted votes in the tallies (520). By analyzing the tallies (520) at 9:41 AM, the aggregate FOV selection is identified as requesting to move the FOV (141) to the right-direction. Accordingly, a control signal is generated by the FOV controller (120) to shift the FOV (141) to the right-direction shortly after 9:41 AM (e.g., 1 second, 3 seconds, etc.).

Figure 6:
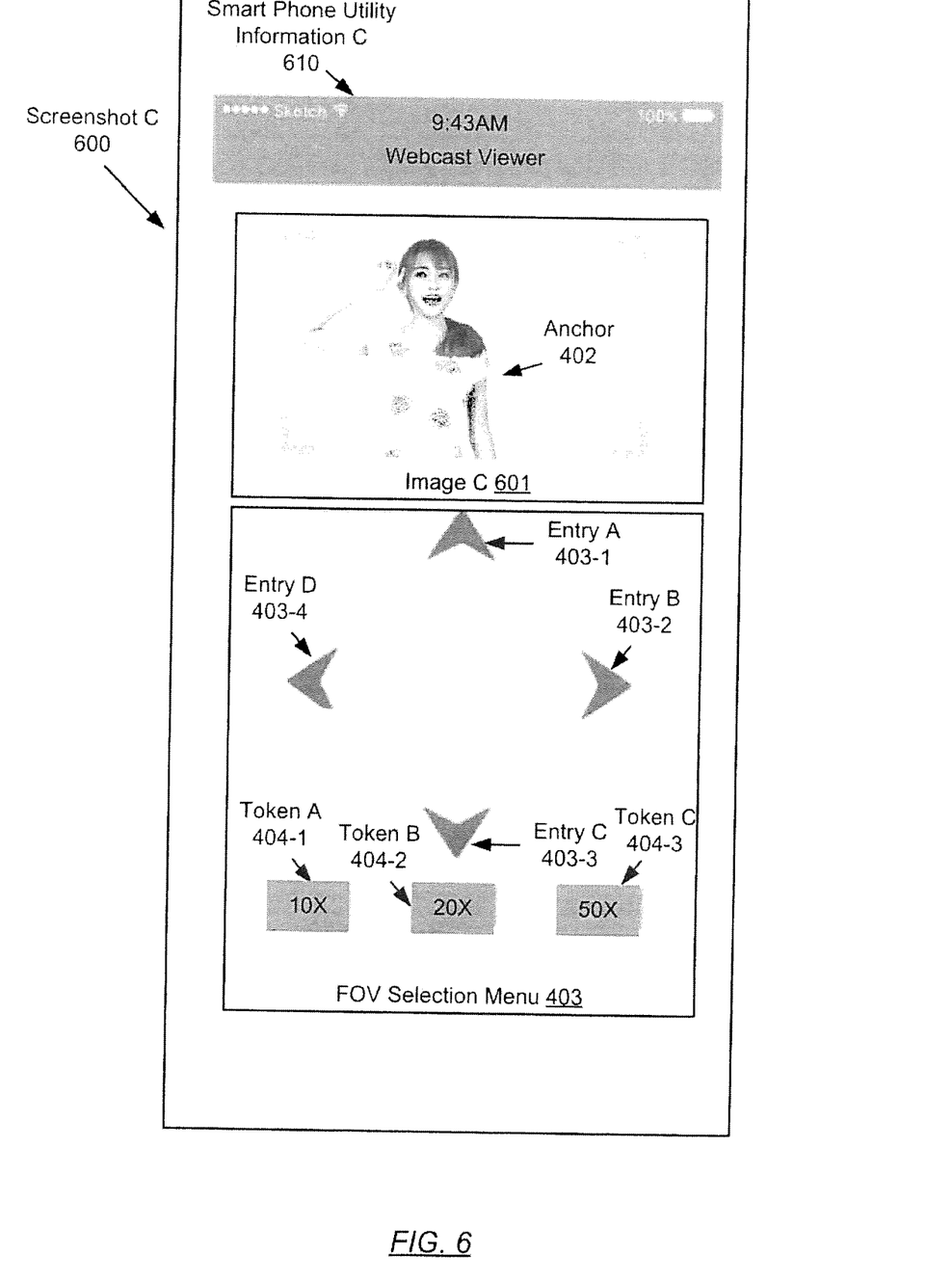

FIG. 6 shows an example screenshot C (600) of the display (151) depicted in FIG. 1.1 above. As shown in FIG. 6, the screenshot C (600) includes smart phone utility information C (610), an image C (601), and a FOV selection menu (403). In particular, the smart phone utility information B (610) indicates that the screenshot C (600) is captured at 9:43 AM on a webcast viewer's device, such as the viewer device A (150a) depicted in FIG. 1.1 above. Comparing to the image A (401) depicted in FIG. 4 above where the anchor (402) appears in the center portion of the image A (401), the anchor (402) of the webcast now appears in the left portion of the image C (601). This is the result of shifting the FOV (141) to the right-direction shortly after 9:41 AM (e.g., 1 second, 3 seconds, etc.). In addition, the previous tallies are cleared from the FOV selection menu (403) until the next voting time span commences.

Figure 7A:
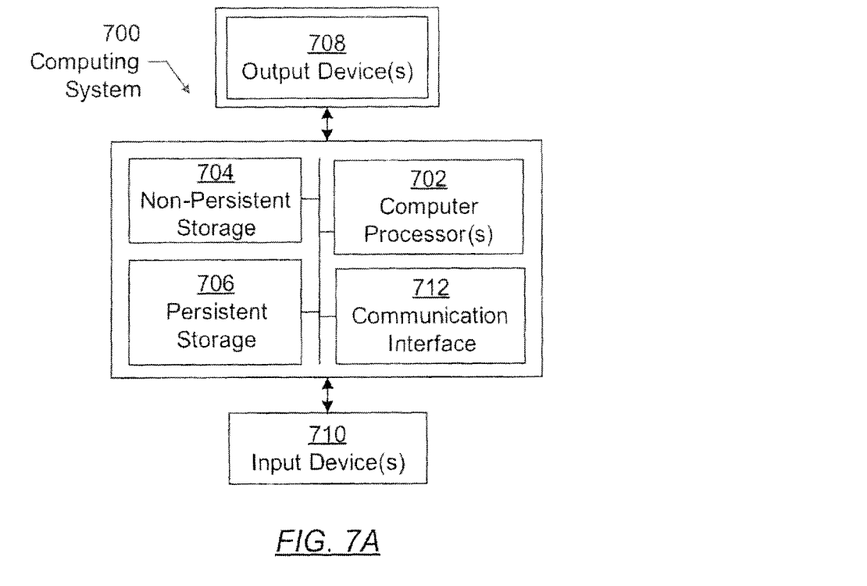
FIGS. 7A and 7B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g, a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
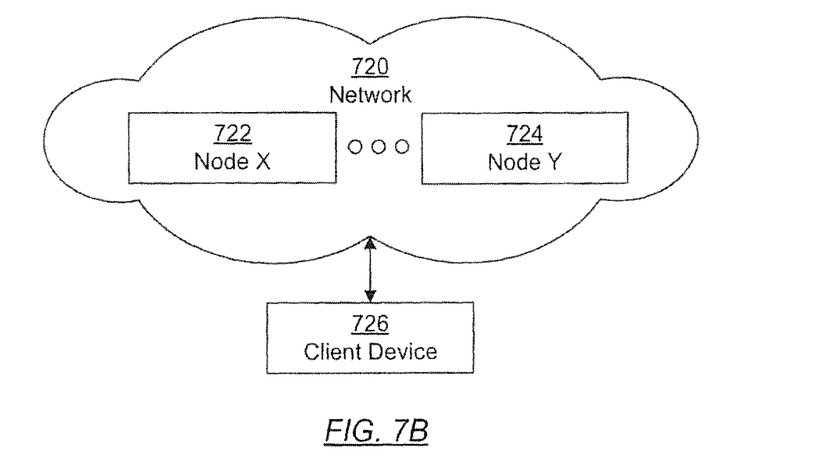

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g, node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling a field-of-view (FOV) of a camera device, comprising:
    receiving, in response to the camera device capturing and broadcasting an image, a plurality of FOV selections from a plurality of viewer devices, wherein each of the plurality of FOV selections comprises a request to adjust the FOV of the camera device;
    selecting, based on a pre-determined criterion, an aggregate FOV selection from the plurality of FOV selections; and
    generating, in response to selecting the aggregate FOV selection, a control signal for adjusting the FOV of the camera device based on the aggregate FOV selection,
    wherein the camera device broadcasts, to the plurality of viewer devices, an adjusted image captured in response to adjusting the FOV of the camera device.

2. The method of claim 1, further comprising:
    presenting, on each of the plurality of viewer devices, a FOV selection message associated with the image;
    wherein the plurality of FOV selections are received from the plurality of viewer devices in response to presenting the FOV selection message,
    wherein the FOV selection message prompts a plurality of viewers to submit the plurality of FOV selections,
    wherein the camera device initiates a webcast that is viewed by the plurality of viewers corresponding to the plurality of viewer devices, and
    wherein the aggregate FOV selection is submitted by at least one selected from a group consisting of a majority, a median, and a minority of the plurality of viewers.

3. The method of claim 2, further comprising:
    generating a plurality of tallies each corresponding to a portion of the plurality of FOV selections submitted based on a same entry in a FOV selection menu comprised in the FOV selection message,
    wherein selecting the aggregate FOV selection is based on the plurality of tallies.

4. The method of claim 3,
wherein the FOV selection menu presents a real-time representation of the plurality of FOV selections,
wherein the FOV selection menu further prompts each of the plurality of viewers to submit a pre-determined token to increase a weight of the FOV selection,
wherein generating the plurality of tallies is based at least on the weight.

5. The method of claim 1,
wherein the request to adjust the FOV of the camera device corresponds to at least one selected from a group consisting of a pre-determined movement direction of the FOV, a pre-determined displacement of the FOV, and a pre-determined zoom of the FOV, and
wherein adjusting the FOV of the camera device comprises at least one selected from a group consisting of adjusting a camera angle, adjusting a camera zoom, and adjusting a camera position of the camera device.

6. The method of claim 1, further comprising:
identifying a trigger condition based on at least one selected from a group consisting of a user input to the camera device, a pre-determined schedule, and a pre-determined event,
wherein selecting the aggregate FOV selection is in response to the trigger condition.

7. The method of claim 6, further comprising:
receiving the user input from an anchor of the webcast,
wherein the webcast comprises live streaming content featuring the anchor, and
wherein the live streaming content comprises the image and the adjusted image.

8. A field-of-view (FOV) controller for a camera device, comprising:
a computer processor; and
memory storing instructions, when executed, causing the computer processor to:
receive, in response to the camera device capturing and broadcasting an image, a plurality of FOV selections from a plurality of viewer devices, wherein each of the plurality of FOV selections comprises a request to adjust the FOV of the camera device;
select, based on a pre-determined criterion, an aggregate FOV selection from the plurality of FOV selections; and
generate, in response to selecting the aggregate FOV selection, a control signal for adjusting the FOV of the camera device based on the aggregate FOV selection,
wherein the camera device broadcasts, to the plurality of viewer devices, an adjusted image captured from the camera device in response to adjusting the FOV of the camera device.

9. The FOV controller of claim 8, the instructions, when executed, further causing the computer processor to:
present, on each of the plurality of viewer devices, a FOV selection message associated with the image;
wherein the plurality of FOV selections are received from the plurality of viewer devices in response to presenting the FOV selection message,
wherein the FOV selection message prompts a plurality of viewers to submit the plurality of FOV selections,
wherein the camera device initiates a webcast that is viewed by the plurality of viewers corresponding to the plurality of viewer devices, and
wherein the aggregate FOV selection is submitted by at least one selected from a group consisting of a majority, a median, and a minority of the plurality of viewers.

10. The FOV controller of claim 9, the instructions, when executed, further causing the computer processor to:
generate a plurality of tallies each corresponding to a portion of the plurality of FOV selections submitted based on a same entry in a FOV selection menu comprised in the FOV selection message,
wherein selecting the aggregate FOV selection is based on the plurality of tallies.

11. The FOV controller of claim 10,
wherein the FOV selection menu presents a real-time representation of the plurality of FOV selections,
wherein the FOV selection menu further prompts each of the plurality of viewers to submit a pre-determined token to increase a weight of the FOV selection,
wherein generating the plurality of tallies is based at least on the weight.

12. The method of claim 8,
wherein the request to adjust the FOV of the camera device corresponds to at least one selected from a group consisting of a pre-determined movement direction of the FOV, a pre-determined displacement of the FOV, and a pre-determined zoom of the FOV, and
wherein adjusting the FOV of the camera device comprises at least one selected from a group consisting of adjusting a camera angle, adjusting a camera zoom, and adjusting a camera position of the camera device.

13. The FOV controller of claim 8, the instructions, when executed, further causing the computer processor to:
identify a trigger condition based on at least one selected from a group consisting of a user input to the camera device, a pre-determined schedule, and a pre-determined event,
wherein selecting the aggregate FOV selection is in response to the trigger condition.

14. The FOV controller of claim 13, the instructions, when executed, further causing the computer processor to:
receive the user input from an anchor of the webcast,
wherein the webcast comprises live streaming content featuring the anchor, and
wherein the live streaming content comprises the image and the adjusted image.

15. A non-transitory computer readable medium storing instructions for controlling a field-of-view (FOV) of a camera device, the instructions, when executed by a computer processor, comprising functionality for:
receiving, in response to the camera device capturing and broadcasting an image, a plurality of FOV selections from a plurality of viewer devices, wherein each of the plurality of FOV selections comprises a request to adjust the FOV of the camera device;
selecting, based on a pre-determined criterion, an aggregate FOV selection from the plurality of FOV selections; and
generating, in response to selecting the aggregate FOV selection, a control signal for adjusting the FOV of the camera device based on the aggregate FOV selection,
wherein the camera device broadcasts, to the plurality of viewer devices, an adjusted image captured in response to adjusting the FOV of the camera device.

16. The non-transitory computer readable medium of claim 15, the instructions, when executed by the computer processor, further comprising functionality for:
presenting, on each of the plurality of viewer devices, a FOV selection message associated with the image;
wherein the plurality of FOV selections are received from the plurality of viewer devices in response to presenting the FOV selection message, wherein the FOV selection message prompts a plurality of viewers to submit the plurality of FOV selections, wherein the camera device initiates a webcast that is viewed by the plurality of viewers corresponding to the plurality of viewer devices, and wherein the aggregate FOV selection is submitted by at least one selected from a group consisting of a majority, a median, and a minority of the plurality of viewers.

17. The non-transitory computer readable medium of claim 16, the instructions, when executed by the computer processor, further comprising functionality for:

generating a plurality of tallies each corresponding to a portion of the plurality of FOV selections submitted based on a same entry in a FOV selection menu comprised in the FOV selection message, wherein selecting the aggregate FOV selection is based on the plurality of tallies, wherein the FOV selection menu presents a real-time representation of the plurality of FOV selections, wherein the FOV selection menu further prompts each of the plurality of viewers to submit a pre-determined token to increase a weight of the FOV selection, wherein generating the plurality of tallies is based at least on the weight.

18. The non-transitory computer readable medium of claim 15, wherein the request to adjust the FOV of the camera device corresponds to at least one selected from a group consisting of a pre-determined movement direction of the FOV, a pre-determined displacement of the FOV, and a pre-determined zoom of the FOV, and wherein adjusting the FOV of the camera device comprises at least one selected from a group consisting of adjusting a camera angle, adjusting a camera zoom, and adjusting a camera position of the camera device.

19. The non-transitory computer readable medium of claim 15, the instructions, when executed by the computer processor, further comprising functionality for:

identifying a trigger condition based on at least one selected from a group consisting of a user input to the camera device, a pre-determined schedule, and a pre-determined event, wherein selecting the aggregate FOV selection is in response to the trigger condition.

20. The non-transitory computer readable medium of claim 19, the instructions, when executed by the computer processor, further comprising functionality for:

receiving the user input from an anchor of the webcast, wherein the webcast comprises live streaming content featuring the anchor, and wherein the live streaming content comprises the image and the adjusted image.

* * * * *